US012681365B2

(12) United States Patent (10) Patent No.: US 12,681,365 B2
Bowen (45) Date of Patent: Jul. 14, 2026

(54) RECORDING DEVICE HOLDER

(71) Applicant: ReVonda Bowen, Atlanta, GA (US)

(72) Inventor: ReVonda Bowen, Atlanta, GA (US)

( * ) Notice: Subject to any disclaimer, the term of this patent is extended or adjusted under 35 U.S.C. 154(b) by 0 days.

(21) Appl. No.: 18/486,329

(22) Filed: Oct. 13, 2023

(65) Prior Publication Data

US 2024/0126152 A1 Apr. 18, 2024

Related U.S. Application Data

(60) Provisional application No. 63/416,007, filed on Oct. 14, 2022.

(51) Int. Cl.
G03B 17/56 (2021.01)
G03B 15/05 (2021.01)

(52) U.S. Cl.
CPC ........... G03B 17/561 (2013.01); G03B 15/05 (2013.01); *G03B 2215/0517* (2013.01); *G03B 2215/0567* (2013.01)

(58) Field of Classification Search
CPC .................. G03B 17/561; G03B 15/05; G03B 2215/0517; G03B 2215/0567
See application file for complete search history.

(56) References Cited

U.S. PATENT DOCUMENTS

| | | | |
|---|---|---|---|
| 4,771,300 A | 9/1988 | Bryan | |
| 8,139,122 B2 * | 3/2012 | Rolston | A46B 15/0036 |
| | | | 348/222.1 |
| 10,398,213 B2 * | 9/2019 | Vargas | H04N 23/50 |

| | | | |
|---|---|---|---|
| 10,795,245 B1 | 10/2020 | Kaiser | |
| 10,935,231 B2 | 3/2021 | Frydenger | |
| 2018/0114493 A1 * | 4/2018 | McLaughlin | H04N 23/56 |
| 2018/0139374 A1 * | 5/2018 | Yu | H04N 21/6587 |
| 2018/0270410 A1 * | 9/2018 | Lyle | H04N 23/51 |
| 2019/0206126 A1 * | 7/2019 | Solomon | H04M 1/72409 |

FOREIGN PATENT DOCUMENTS

| | | | |
|---|---|---|---|
| CN | 204176275 U | * | 2/2015 |
| CN | 210227251 U | * | 4/2020 |
| CN | 215776146 U | * | 2/2022 |
| KR | 200170643 Y1 | | 2/2006 |

OTHER PUBLICATIONS

Mirrorfone, WeatherTech, 2023, Accessed via web Oct. 12, 2023 (https://www.weathertech.com/mirrorfone/).

* cited by examiner

*Primary Examiner* — Minh Q Phan
(74) *Attorney, Agent, or Firm* — Ballard Spahr LLP

(57) ABSTRACT

Described is a recording device holder apparatus comprising a substrate comprising an outer perimeter, a front face, and a back face, wherein the front face is reflective, wherein the front face and the back face extend along the longitudinal axis and the lateral axis, and the substrate further comprises an inner perimeter defining a void space, wherein the void space extends from the front face to the back face, wherein the inner perimeter is completely within the bounds of the outer perimeter; and a device mounting system attached to the substrate via a fastener, wherein the fastener is interfaced with the back face or the front face and back face of the substrate, such that the device mounting system is configured to position a visual recording device substantially in the same plane as the longitudinal axis and the lateral axis and within the void space.

19 Claims, 6 Drawing Sheets

RECORDING DEVICE HOLDER

CROSS-REFERENCE TO RELATED APPLICATIONS

This application claims priority to and the benefit of the filing date of U.S. Provisional Patent Application No. 63/416,007, filed Oct. 14, 2022, the entirety of which is hereby incorporated by reference herein in its entity for all purposes.

BACKGROUND

The rise of social media in recent years has been accompanied by an increase in popularity of video-based user content. As more content creators and individual users endeavor to self-produce content, there is a need for devices that facilitate the production of images and video without the need for a second user to assist in recording. Although technology such as device tripods, selfie sticks, and device holders are widespread, it is still a challenge for users to obtain panoramic views of their surroundings and of their appearance during self-recording of images and videos.

Thus, there is a need in the art for improved recording device technologies, such as holders to facilitate single user recordings. Such a recording device holder is disclosed herein.

SUMMARY OF THE INVENTION

Figure 1A:
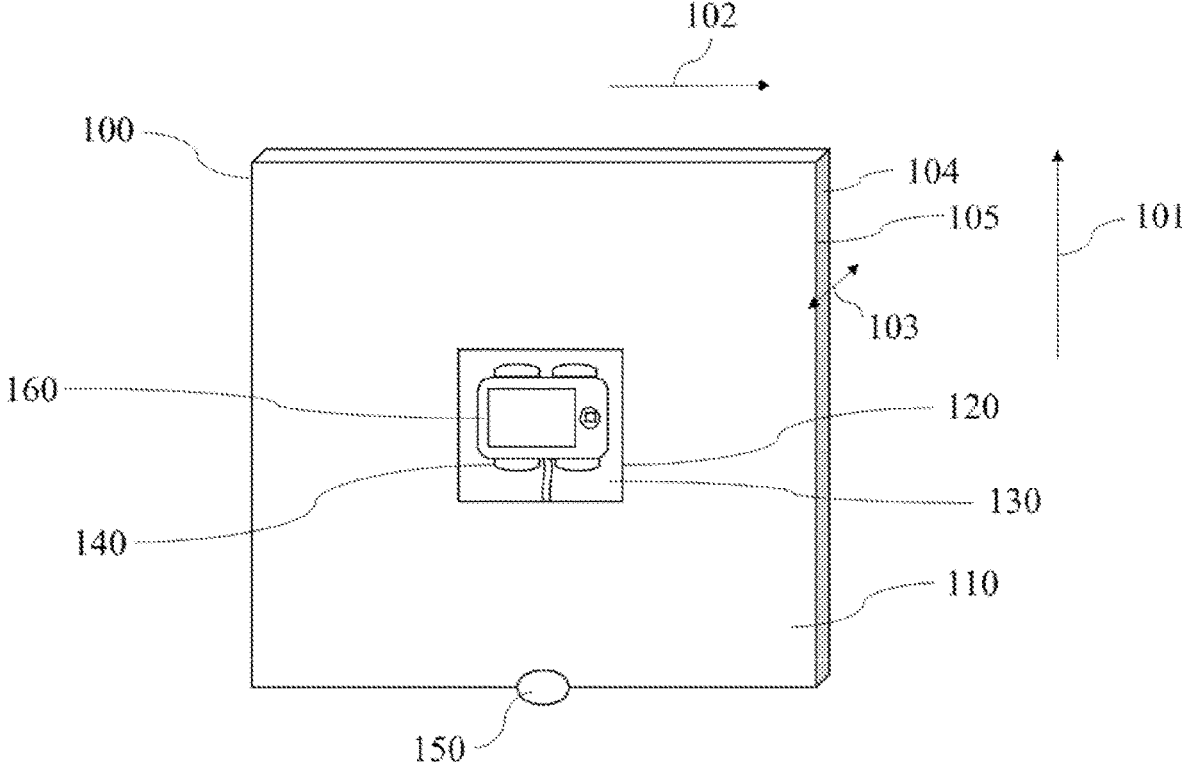
FIG. 1A illustrates a front view of an embodiment of a recording device holder apparatus.

Disclosed herein is an apparatus comprising: a longitudinal axis; a lateral axis extending perpendicular to the longitudinal axis; a vertical axis extending perpendicular to both the longitudinal axis and the lateral axis; a substrate comprising an outer perimeter, a front face, and a back face, wherein the front face is reflective, wherein the front face and the back face extend along the longitudinal axis and the lateral axis, and the substrate further comprises an inner perimeter also along the longitudinal axis and lateral axis defining a void space, wherein the void space extends from the front face to the back face along the vertical axis, wherein the inner perimeter is completely within the bounds of the outer perimeter; and a device mounting system attached to the substrate via a fastener, wherein the fastener is interfaced with the back face or the front face and back face of the substrate, such that the device mounting system is configured to position a visual recording device substantially in the same plane as the longitudinal axis and the lateral axis and within the void space.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

The present invention can be understood more readily by reference to the following detailed description of the invention and the examples included therein.

Before the present particles, compositions, articles, systems, devices, and/or methods are disclosed and described, it is to be understood that they are not limited to specific methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

As used in the specification and the appended claims, the singular forms "a," "an," and "the" include plural referents unless the context clearly dictates otherwise.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that a subsequently described event or circumstance can or cannot occur, and that the description includes instances where said event or circumstance occurs and instances where it does not.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible nonexpress basis for interpretation, including: matters of logic with respect to arrangement of steps or operational flow, plain meaning derived from grammatical organization or punctuation, and number or type of embodiments described in the specification.

A. APPARATUS

In one aspect, disclosed herein is an apparatus comprising: a longitudinal axis; a lateral axis extending perpendicular to the longitudinal axis; a vertical axis extending perpendicular to both the longitudinal axis and the lateral axis; a substrate comprising an outer perimeter, a front face, and a back face, wherein the front face is reflective, wherein the front face and the back face extend along the longitudinal axis and the lateral axis, and the substrate further comprises an inner perimeter also along the longitudinal axis and lateral axis defining a void space, wherein the void space extends from the front face to the back face along the vertical axis, wherein the inner perimeter is completely within the bounds of the outer perimeter; and a device mounting system attached to the substrate via a fastener, wherein the fastener is interfaced with the back face or the front face and back face of the substrate, such that the device mounting system is configured to position a visual recording device substantially in the same plane as the longitudinal axis and the lateral axis and within the void space.

The disclosed recording device holder apparatus is designed to serve three purposes. Firstly, the reflective front face provides the user a panoramic view of their surroundings during video or image recording. This allows the user to more easily manipulate their surroundings and their physical appearance without the need to reposition the recording device. Secondly, the positioning of the visual recording device substantially in the same plane as the longitudinal axis and the lateral axis and within the void space allows for maximum exposed surface area of the reflective front face. This allows the user to view the maximum amount of their surroundings during the recording session, as the reflective front face is not obstructed by the camera. Lastly, the positioning of the visual recording device substantially in the same plane as the longitudinal axis and the lateral axis, reduces the visual distortion in the image obtained by the recording device due to the difference in spatial distance between the user and the recording device and the user and the user's reflection.

Figure 1B:
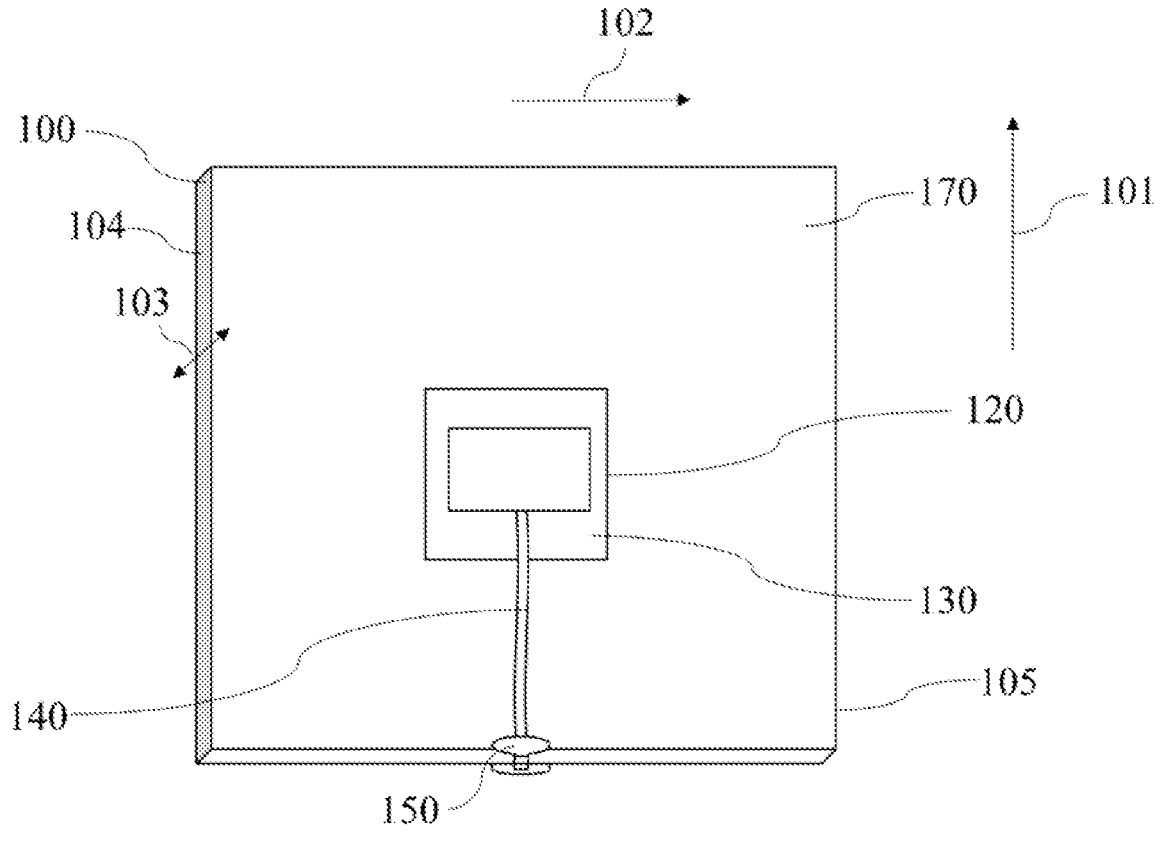
FIG. 1B illustrates a back view of an embodiment of a recording device holder apparatus.
Figure 2:
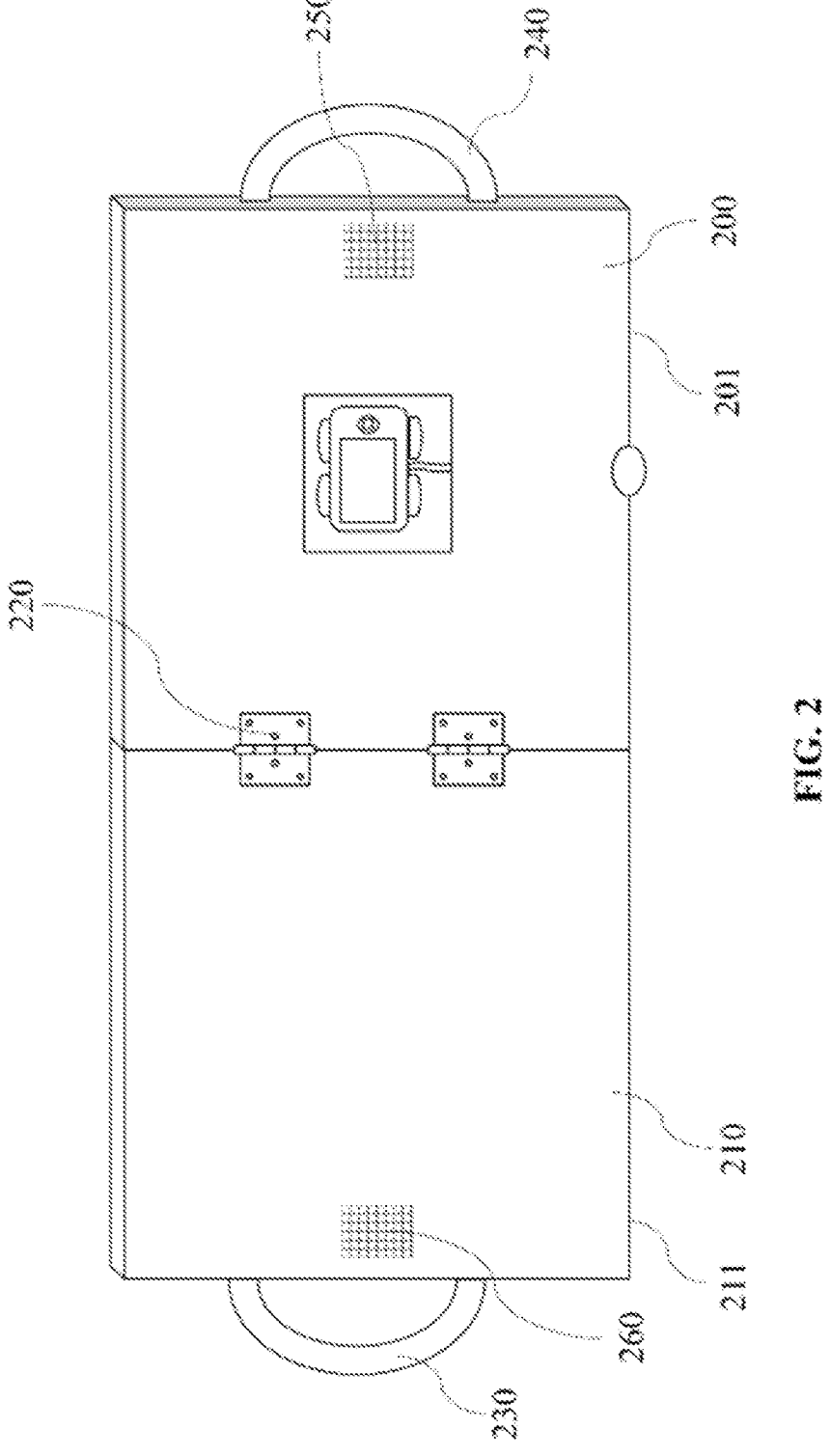
FIG. 2 illustrates a front view of an embodiment of a recording device holder apparatus.

Referring to FIG. 1A and FIG. 1B, for example, the apparatus 100 comprises a longitudinal axis 101; a lateral axis 102 extending perpendicular to the longitudinal axis; a vertical axis 103 extending perpendicular to both the longitudinal axis and the lateral axis; a substrate 104 comprising an outer perimeter 105, a reflective front face 110, a back face 170, an inner perimeter 120 also along the longitudinal axis and lateral axis defining a void space 130, and a device mounting system 140 attached to the substrate via a fastener 150 to hold a recording device 160 substantially in the same plane as the longitudinal axis and the lateral axis and within the void space. As shown here, the device mounting system can be a gooseneck type device mounting system such as that disclosed in US 2008/0158411A1 or U.S. Pat. No. 9,038,971, both of which are incorporated herein by reference for this disclosure, wherein the fastener is a clamp-based fastener that is secured on the front face and the back face.

In various aspects, the substrate is a mirror.

In various aspects, the outer perimeter comprises a plurality of edges. The substrate can be any shape comprising a plurality of edges. In some aspects, the substrate comprises the shape of a square. In some aspects, the substrate comprises the shape of a rectangle. In some aspects, the substrate comprises the shape of a triangle. In some aspects, the substrate comprises the shape of a pentagon. In some aspects, the substrate comprises the shape of a hexagon. In some aspects, the substrate comprises the shape of a heptagon. In some aspects, the substrate comprises the shape of an octagon. In some aspects, the substrate comprises the shape of a nonagon. In some aspects, the substrate comprises the shape of a decagon. In some aspects, the substrate comprises the shape of a decagon. In some aspects, the substrate can comprise the shape of any multi-sided polygon. In a further aspect, the outer perimeter does not comprise edges. In a still further aspect, the substrate can comprise the shape of a circle. In a still further aspect, the substrate can comprise the shape of an oval. In a yet further aspect, the substrate can comprise the shape of an ellipse. In a yet further aspect, the substrate can comprise the shape of a semi-circle. In a yet further aspect, the substrate can comprise the shape of a crescent.

In certain aspects, the substrate has a thickness of about 0.3 inches to about 4 inches along the vertical axis, including exemplary values of about 0.4 inches, about 0.5 inches, about 0.6 inches, about 0.8 inches, about 1 inch, about 1.5 inches, about 2 inches, about 2.5 inches, about 3 inches, and about 3.5 inches. In a still further aspect, the substrate can have any thickness in a range derived from any two of the above listed exemplary values. For example, the substrate can comprise a thickness along the vertical axis of about 0.4 to about 3 inches, or from about 0.3 to about 3 inches.

In certain aspects, the substrate has a height of about 7 inches to about 30 inches along the longitudinal axis, including exemplary values of about 7.5 inches, about 8 inches, about 8.5 inches, about 9 inches, about 9.5 inches, about 10 inches, about 11 inches, about 12 inches, about 13 inches, about 14 inches, about 15 inches, about 18 inches, about 21 inches, about 25 inches, about 29 inches, and about 29.5 inches. In a still further aspect, the substrate can have any height in a range derived from any two of the above listed exemplary values. For example, the substrate can comprise a height along the longitudinal axis of about 7.5 inches to about 25 inches, or from about 7 inches to about 29.5 inches.

In certain aspects, the substrate has a width of about 7 inches to about 30 inches along the lateral axis, including exemplary values of about 7.5 inches, about 8 inches, about 8.5 inches, about 9 inches, about 9.5 inches, about 10 inches, about 11 inches, about 12 inches, about 13 inches, about 14 inches, about 15 inches, about 18 inches, about 21 inches, about 25 inches, about 29 inches, and about 29.5 inches. In a still further aspect, the substrate can have any width in a range derived from any two of the above listed exemplary values. For example, the substrate can comprise a width along the lateral axis of about 7.5 inches to about 25 inches, or from about 7 inches to about 29.5 inches.

In various aspects, the substrate also comprises an inner perimeter also along the longitudinal axis and lateral axis defining a void space, wherein the void space extends from the front face to the back face along the vertical axis, wherein the inner perimeter is completely within the bounds of the outer perimeter. In some aspects, the inner perimeter defining a void space can comprise a plurality of edges. The void space can be any shape comprising a plurality of edges. In some aspects, the void space comprises the shape of a square. In some aspects, the void space comprises the shape of a rectangle. In some aspects, the void space comprises the shape of a triangle. In some aspects, the void space comprises the shape of a pentagon. In some aspects, the void space comprises the shape of a hexagon. In some aspects, the void space comprises the shape of a heptagon. In some aspects, the void space comprises the shape of an octagon. In some aspects, the void space comprises the shape of a nonagon. In some aspects, the void space comprises the shape of a decagon. In some aspects, the void space comprises the shape of a decagon. In some aspects, the void space can comprise the shape of any multi-sided polygon. In a further aspect, the inner perimeter does not comprise edges. In a still further aspect, the substrate can comprise the shape of a circle. In a still further aspect, the substrate can comprise the shape of an oval. In a yet further aspect, the substrate can comprise the shape of an ellipse. In a yet further aspect, the substrate can comprise the shape of a semi-circle. In a yet further aspect, the substrate can comprise the shape of a crescent.

In certain aspects, the void space has a thickness of about 0.3 inches to about 4 inches along the vertical axis, including exemplary values of about 0.4 inches, about 0.5 inches, about 0.6 inches, about 0.8 inches, about 1 inch, about 1.5 inches, about 2 inches, about 2.5 inches, about 3 inches, and about 3.5 inches. In a still further aspect, the void space can have any thickness in a range derived from any two of the above listed exemplary values. For example, the void space can comprise a thickness along the vertical axis of about 0.4 to about 3 inches, or from about 0.3 to about 3 inches.

In certain aspects, the void space has a height of about 6 inches to about 20 inches along the longitudinal axis, including exemplary values of about 6.5 inches, about 7 inches, about 7.5 inches, about 9 inches, about 9.5 inches, about 10 inches, about 11 inches, about 12 inches, about 13 inches, about 14 inches, about 15 inches, about 18 inches, and about 19 inches. In a still further aspect, the void space can have any height in a range derived from any two of the above listed exemplary values. For example, the void space can comprise a height along the longitudinal axis of about 6.5 inches to about 20 inches, or from about 6 inches to about 19 inches.

In certain aspects, the void space has a width of about 3 inches to about 20 inches along the lateral axis, including exemplary values of about 3.5 inches, about 4 inches, about 4.5 inches, about 5 inches, about 6 inches, about 7 inches, about 8 inches, about 9 inches, about 10 inches, about 13 inches, about 16 inches, and about 19 inches. In a still further aspect, the void space can have any width in a range derived from any two of the above listed exemplary values. For example, the void space can comprise a width along the lateral axis of about 3.5 inches to about 20 inches, or from about 3 inches to about 19 inches.

The void space can be located anywhere within the bounds of the outer perimeter. The void space can be located, for example, in the top left quadrant of the substrate, in the top right quadrant of the substrate, in the bottom left quadrant of the substrate, or in the bottom right quadrant of the substrate. In some aspects, the void space is located at the center of the substrate.

The device mounting system can be any type of device mounting system that can be attached to the substrate via a fastener to hold a visual recording device. Examples of device mounting systems that can be incorporated into the apparatus include, but are not limited to, suction cup-type device holders, tripod head mounts, device holders that utilize sticky adhesive such as 3M adhesive, gooseneck and clamp device holders, automatic locking device holders, and the like.

In some aspects, the device mounting system can further comprise additional components, such as, but not limited to, extension parts, gimbal stabilizers, and threading.

In certain aspects, the device mounting system is capable of rotating the visual recording device from an initial position, wherein the initial position is in the same plane as the longitudinal axis and the lateral axis and within the void space, to a second position. The second position can be in a plane that puts the device mounting system in a plane that is not the same plane as the longitudinal axis or the lateral axis to differ from the first position. Rotation can be achieved through, for example, manually adjusting the flexible arm of a gooseneck-type device holder to achieve a desired angle. In such aspects, the visual recording device can be rotated about the longitudinal axis. In further aspects, the visual recording device can be rotated about the lateral axis. In yet further aspects, the visual recording device can be rotated about the vertical axis. In yet still further aspects, the visual recording device can be rotated about the longitudinal axis and the lateral axis. In yet still further aspects, the visual recording device can be rotated about the longitudinal axis and the vertical axis. In yet still further aspects, the visual recording device can be rotated about the lateral axis and the vertical axis. In yet still further aspects, the visual recording device can be rotated about the longitudinal axis, the lateral axis, and the vertical axis.

Also disclosed herein are methods of rotating a visual recording device in an apparatus as disclosed herein, wherein the method comprises the steps of: a. providing an apparatus and a visual recording device as disclosed herein, wherein the device mounting system is configured to position the visual recording device in an initial position, wherein the initial position is substantially in the same plane as the longitudinal axis and the lateral axis and within the void space; and b. rotating the visual recording device into a final position, wherein the visual recording device is rotated about the longitudinal axis, about the lateral axis, about the vertical axis, about the longitudinal axis and lateral axis, about the longitudinal axis and vertical axis, about the lateral axis and vertical axis, or about the longitudinal axis, the lateral axis, and the vertical axis.

Rotation of the visual recording device from an initial position to a second position, which can be a final, position allows the user to record images or video while the visual recording device is simultaneously rotated or to position the visual recording device into a desired angle before recording. In some aspects, the visual recording device is rotated during video or image recording. In further aspects, the visual recording device is rotated prior to video or image recording.

The methods of rotating of rotating a visual recording device in an apparatus as disclosed herein can comprise any number of intermediate positions between the initial position and the final position.

In some aspects, the visual recording device is rotated manually by the user. The visual recording device can be manually rotated by the user when, for example, the device mounting system comprises a gooseneck type device holder, and the flexible arm ("gooseneck") is adjusted to position the visual recording device in a desired configuration or angle.

In some aspects, the visual recording device is rotated by the user with a remote control. In such aspects, the device mounting system can comprise a motor which can wirelessly communicate with a remote control to rotate the visual recording device to a final position. In such aspects, the device mounting system can be, for example, a wireless motorized pan tilt mount.

In some aspects, the visual recording device is rotated by the user inputting a rotation program through a computer or phone application which is interfaced with the device mounting system via, for example, Bluetooth. In such aspects, the device mounting system can comprise a motor. The user can input a rotation program in the application prior to recording. An example of a device mounting system suitable for rotating a visual recording device by user input through a computer or phone application is GripTight™ PRO phone mount with Spin Phone Mount Kit manufactured by Joby Photo and interfaced with the Joby Motion App, also manufactured by Joby Photo.

In some aspects, the visual recording device is rotated by motion tracking technology and image detection. In such aspects, the device mounting system can comprise a motion sensor and utilize artificial intelligence such that the visual recording device can focus on the user. Motion sensing technology can be utilized to rotate the visual recording device from an initial position to a final position while simultaneously recording images or video. Examples of device mounting systems which can rotate the visual recording device using motion sensing include Pivo Pod manufactured by Pivo Inc. and OBSBOT Me AI-Powered Selfie Phone Mount manufactured by OBSBOT.

The visual recording device can be any type of recording device that is capable of capturing visual media. Examples of recording devices for use with the apparatus include, but are not limited to, smartphones, tablets that comprise an integrated camera, film cameras, digital cameras, video recorders such as camcorders, GoPro cameras, and the like. In some aspects, the visual recording device can comprise auto tracking robot technology. The visual recording device can be, for example, an auto tracking robot camera produced by SoloShot. Such a recording device allows for further user autonomy, as the camera "follows" the user's movements to keep the user within the frame.

In various aspects, the substrate further comprises: a first portion defined by a first portion outer perimeter and; a second portion defined by a second portion outer perimeter, wherein the first portion is connected to the second portion such that the apparatus is configured to be movable about and between a collapsed configuration and an expanded configuration. In a further aspect, the void space is positioned entirely within the bounds of the first portion outer perimeter. In a further aspect, the void space is positioned entirely within the bounds of the second portion outer perimeter. In a further aspect, the void space is positioned in both the first portion and the second portion. The void space can be located anywhere within the bounds of the first portion outer perimeter. The void space can be located, for example, in the top left quadrant of the first portion, in the top right quadrant of the first portion, in the bottom left quadrant of the first portion, or in the bottom right quadrant of the first portion. In some aspects, the void space is located at the center of the first portion. The void space can be located anywhere within the bounds of the second portion outer perimeter. The void space can be located, for example, in the top left quadrant of the second portion, in the top right quadrant of the second portion, in the bottom left quadrant of the second portion, or in the bottom right quadrant of the second portion. In some aspects, the void space is located at the center of the second portion.

In a further aspect, the first portion is connected to the second portion with a hinge mechanism. Referring to FIG.

2, for example, the substrate can comprise a first portion 200 defined by a first portion outer perimeter 201 and a second portion 210 defined by a second portion outer perimeter 211. The first portion 200 can be connected to the second portion 210 such that the substrate is configured to be movable about and between a collapsed configuration and an expanded configuration. The first portion can be connected to the second portion with a hinge mechanism 220. In some embodiments, the apparatus can also comprise one or more handles 230 and 240. Providing a handle allows for increased portability when the substrate is placed into a collapsed configuration. The substrate can also comprise a fastener 250 on the first portion and a fastener 260 on the second portion such that fastener 250 can come into physical contact with fastener 260 and secure the apparatus into a collapsed configuration for increased portability. Fasteners 250 and 260 can be, for example, hook and loop fasteners such as VELCRO fastener, clips, snaps, or other fasteners.

Figure 3:
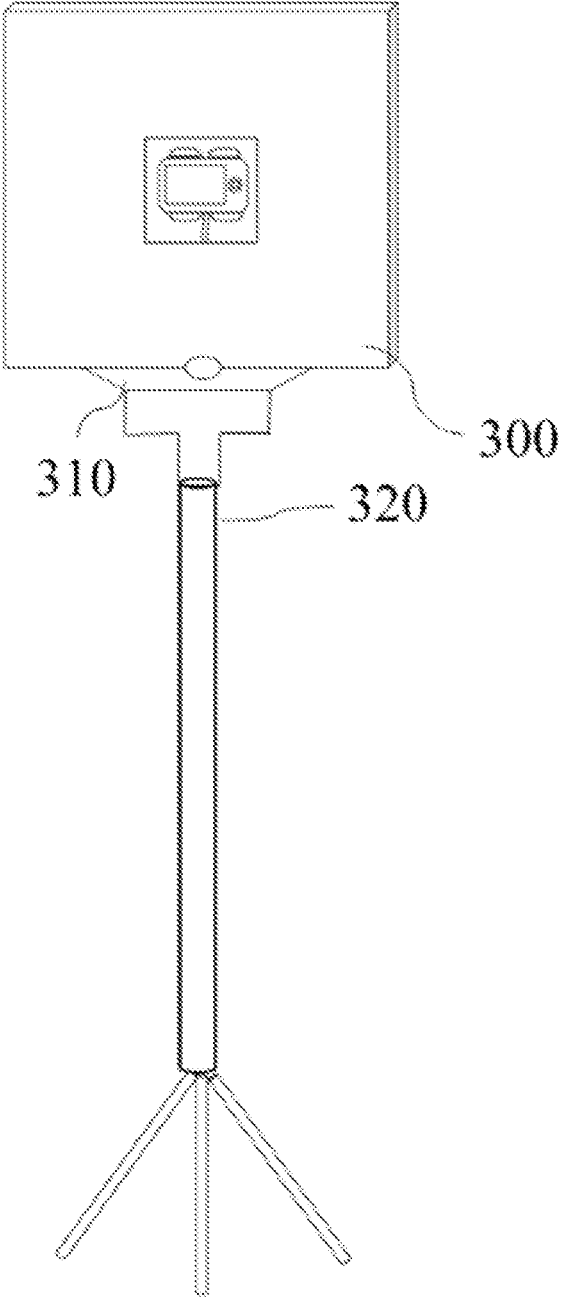
FIG. 3 illustrates a front view of an embodiment of a recording device holder apparatus.

In a further aspect, at least one stand is attached to the back face. In a further aspect, two stands are attached to the back face such that one stand extends perpendicular to the other stand. Referring to FIG. 3, for example, the apparatus 300 can be interfaced with an adapter 310 such that the back face is attached to the adapter and can be mounted onto a tripod 320. The adapter can be, for example, such as that disclosed in U.S. Pat. No. 8,807,849, which can accommodate a variety of substrate sizes, or an adapter such as disclosed in U.S. Pat. No. 9,146,584, both of which are incorporated by reference for this disclosure.

B. LIGHT PRODUCING ELEMENTS

In various aspects, the substrate further comprises at least one light producing element; wherein the light producing element is attached to the substrate.

Figure 4A:
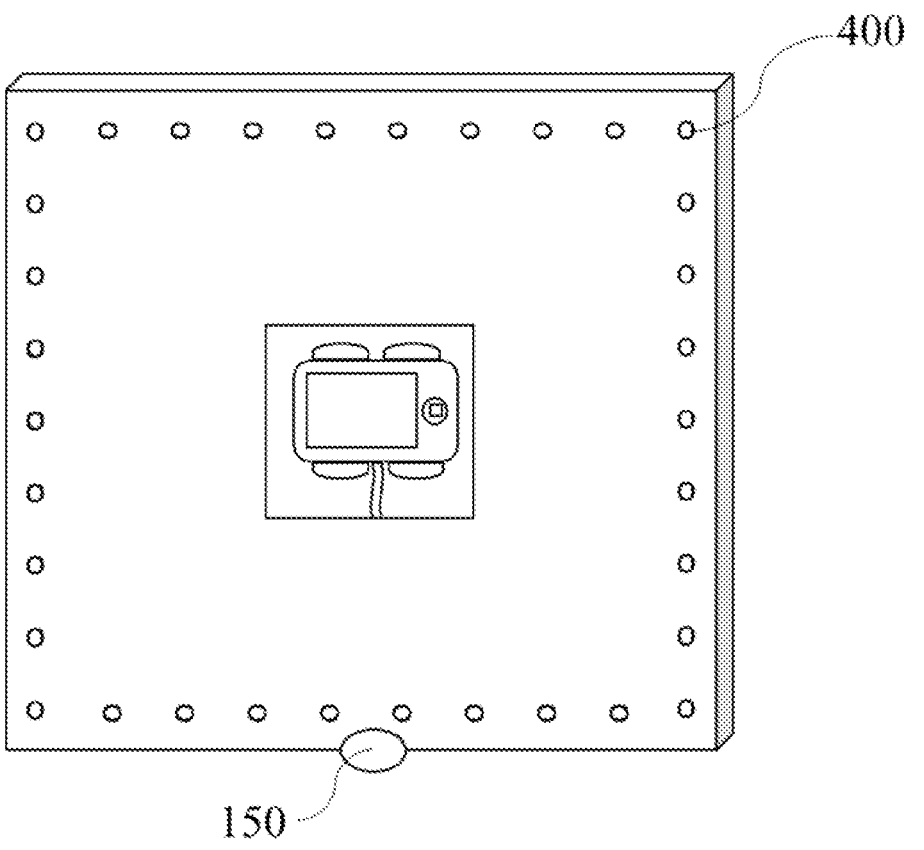
FIG. 4A illustrates a front view of an embodiment of a recording device holder apparatus.
Figure 4B:
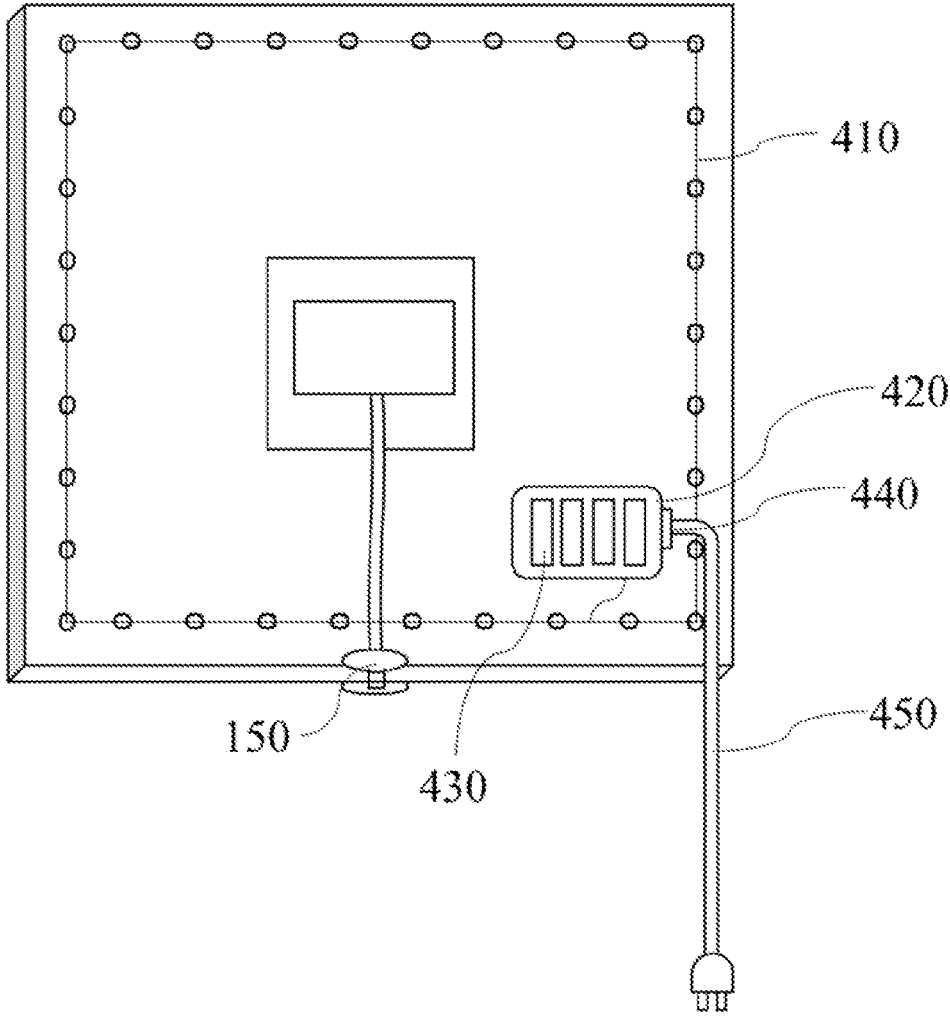
FIG. 4B illustrates a back view of an embodiment of a recording device holder apparatus.

In a further aspect, the light producing element comprises a plurality of light emitting diodes. Referring to FIG. 4A and FIG. 4B, for example, the substrate can comprise a plurality of light emitting diodes (LEDs) 400 attached to the substrate. LEDs may offer advantages such as longer lifetimes and higher color rendering indices. The plurality of light emitting diodes can be a plurality of cool single color light emitting diodes, a plurality warm single color light emitting diodes, a plurality of mixed warm and cool light emitting diodes, or a plurality of three color RGB light emitting diodes. For example, in certain aspects, a plurality of light emitting diodes comprising four LEDs can comprise two pairs of LEDs where the LEDs in a pair are identical. In other embodiments, each LED in a plurality of light emitting diodes is different. In some aspects, different LEDs of the mirror assembly are independently adjustable to provide accomplish any lighting environment desired. In some aspects, LEDs can be paired with other LEDs of lower or higher color temperatures. In certain aspects, LEDs can be paired with other LEDs of with colors that have lower or higher wavelengths.

The plurality of light emitting diodes circuit 410 can be connected to a power source 420 which can also be attached to the back face of the substrate and can comprise a rechargeable battery 430. The power source can further comprise a charging port 440 for direct connection to an electrical battery charging apparatus 450.

In a further aspect, the at least one light producing element comprises one or more fluorescent bulbs. In a yet further aspect, the at least one light producing element comprises one or more incandescent light sources. In a yet still further aspect, the at least one light producing element comprises one or more halogen light sources.

In some aspects, the at least one light producing element can further comprise an electronic switch to configure the at least one light producing element from "off" to "on" mode and vice versa. In a further aspect, the electronic switch can be integrated into a power source.

In a further aspect, the substrate further comprises a power source for the at least one light producing element, wherein the power source is a rechargeable battery. In a still further aspect, the power source further comprises a charging port for direct connection to an electrical battery charging apparatus. In a yet still further aspect, the power source further comprises at least one component of an induction charging system, remaining components of the induction charging system being so provided for charging the rechargeable battery.

In a further aspect, the at least one light producing element can further comprise a rechargeable battery. Examples of rechargeable batteries include, but are not limited to, Lithium Ion (e.g., polymer) or Nickel metal-hydride NIMH, such as the DR-10 made by Duracell. The batteries can also be D, C, AA, AAA, N, 9V, or other type of battery housed in a respectively appropriate storage housing. The storage housing can be configured to hold 1, 2, 3, 4, 6, 8, or any other number of these batteries, as well as batteries that are cylindrical, button, stack, coin, lantern prismatic, bulk packaged, or of other geometry.

C. ASPECTS

In view of the disclosure herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: An apparatus comprising: a longitudinal axis; a lateral axis extending perpendicular to the longitudinal axis; a vertical axis extending perpendicular to both the longitudinal axis and the lateral axis; a substrate comprising an outer perimeter, a front face, and a back face, wherein the front face is reflective, wherein the front face and the back face extend along the longitudinal axis and the lateral axis, and the substrate further comprises an inner perimeter also along the longitudinal axis and lateral axis defining a void space, wherein the void space extends from the front face to the back face along the vertical axis, wherein the inner perimeter is completely within the bounds of the outer perimeter; and a device mounting system attached to the substrate via a fastener, wherein the fastener is interfaced with the back face or the front face and back face of the substrate, such that the device mounting system is configured to position a visual recording device substantially in the same plane as the longitudinal axis and the lateral axis and within the void space.

Aspect 2: The apparatus of aspect 1, wherein the substrate is a mirror.

Aspect 3: The apparatus of aspect 1 or 2, wherein the outer perimeter comprises a plurality of edges.

Aspect 4: The apparatus of any one of aspects 1-3, wherein the substrate further comprises: a first portion defined by a first portion outer perimeter and; a second portion defined by a second portion outer perimeter, wherein the first portion is connected to the second portion such that the substrate is configured to be movable about and between a collapsed configuration and an expanded configuration.

Aspect 5: The apparatus of aspect 4, wherein the first portion is connected to the second portion with a hinge mechanism.

Aspect 6: The apparatus of any one of aspects 1-5, wherein the substrate further comprises at least one light producing element; wherein the light producing element is attached to the substrate.

Aspect 7: The apparatus of aspect 6, wherein the light producing element comprises a plurality of light emitting diodes.

Aspect 8: The apparatus of aspect 6, wherein the light producing element comprises one or more fluorescent bulbs.

Aspect 9: The apparatus of any one of aspects 6-8, wherein the substrate further comprises a power source for the at least one light producing element, wherein the power source is a rechargeable battery.

Aspect 10: The apparatus of aspect 9, wherein the power source further comprises a charging port for direct connection to an electrical battery charging apparatus.

Aspect 11: The apparatus of aspect 9, wherein the power source further comprises at least one component of an induction charging system, remaining components of the induction charging system being so provided for charging the rechargeable battery.

Aspect 12: The apparatus of any one of aspects 4-11, wherein the void space is positioned entirely within the bounds of the first portion outer perimeter.

Aspect 13: The apparatus of any one of aspects 4-12, wherein the void space is positioned entirely within the bounds of the second portion outer perimeter.

Aspect 14: The apparatus of any one of aspects 1-13, wherein at least one stand is attached to the back face.

Aspect 15: The apparatus of aspect 14, wherein two stands are attached to the back face such that one stand extends perpendicular to the other stand.

Aspect 16: The apparatus of any one of aspects 1-15, wherein the apparatus further comprises an auto tracking robot camera.

Aspect 17: The apparatus of any one of aspects 1-16, wherein device mounting system is rotatable.

Aspect 18: The apparatus of any one of aspects 1-17, wherein the substrate comprises a square shape.

Aspect 19: The apparatus of any one of aspects 1-18, wherein the device mounting system comprises a gooseneck type device holder.

Aspect 20: The apparatus of any one of aspects 1-19, wherein the fastener is a clamp-based fastener that is secured on the front face and the back face.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus comprising:
   a longitudinal axis;
   a lateral axis extending perpendicular to the longitudinal axis;

a vertical axis extending perpendicular to both the longitudinal axis and the lateral axis;

a substrate comprising an outer perimeter, a front face, and a back face, wherein the vertical axis is between the front face and the back face, wherein the front face is reflective, wherein the front face and the back face extend along the longitudinal axis and the lateral axis, and the substrate further comprises an inner perimeter also along the longitudinal axis and lateral axis defining a void space, wherein the void space extends from the front face to the back face along the vertical axis, wherein the inner perimeter is completely within the bounds of the outer perimeter, wherein the substrate comprises a first portion defined by a first portion outer perimeter and a second portion defined by a second portion outer perimeter, wherein the first portion is connected to the second portion such that the substrate is configured to be movable about and between a collapsed configuration and an expanded configuration, and wherein the substrate comprises a first portion of a first fastener on the first portion and a second portion of the first fastener on the second portion such that physical contact between the first portion of the first fastener and the second portion of the first fastener secures the apparatus into the collapsed configuration; and a device mounting system attached to the substrate via a mounting fastener, wherein the mounting fastener is interfaced with the back face or the front face and back face of the substrate, wherein the device mounting system is configured to position a visual recording device having a device outer perimeter such that the device outer perimeter is substantially in the same plane as the longitudinal axis and the lateral axis and within the void space, wherein the substrate is a mirror, wherein the apparatus comprises one or more handles.

2. The apparatus of claim 1, wherein the outer perimeter comprises a plurality of edges.

3. The apparatus of claim 1, wherein the first portion of the substrate is connected to the second portion of the substrate with a hinge mechanism.

4. The apparatus of claim 1, wherein the substrate further comprises at least one light producing element; wherein the light producing element is attached to the substrate.

5. The apparatus of claim 4, wherein the light producing element comprises a plurality of light emitting diodes.

6. The apparatus of claim 4, wherein the light producing element comprises one or more fluorescent bulbs.

7. The apparatus of claim 4, wherein the substrate further comprises a power source for the at least one light producing element, wherein the power source is a rechargeable battery.

8. The apparatus of claim 7, wherein the power source further comprises a charging port for direct connection to an electrical battery charging apparatus.

9. The apparatus of claim 7, wherein the power source further comprises at least one component of an induction charging system, remaining components of the induction charging system being so provided for charging the rechargeable battery.

10. The apparatus of claim 1, wherein the void space is positioned entirely within the bounds of the first portion outer perimeter.

11. The apparatus of claim 1, wherein the void space is positioned entirely within the bounds of the second portion outer perimeter.

12. The apparatus of claim 1, wherein at least one stand is attached to the back face.

13. The apparatus of claim 12, wherein two stands are attached to the back face such that one stand extends perpendicular to the other stand.

14. The apparatus of claim 1, wherein the apparatus further comprises an auto tracking robot camera.

15. The apparatus of claim 1, wherein the device mounting system is rotatable.

16. The apparatus of claim 1, wherein the substrate comprises a square shape.

17. The apparatus of claim 1, wherein the device mounting system comprises a gooseneck type device holder.

18. The apparatus of claim 1, wherein the mounting fastener is a clamp-based fastener that is secured on the front face and the back face.

19. The apparatus of claim 1, wherein the one or more handles comprises a first handle attached to the first portion of the substrate and a second handle attached to the second portion of the substrate.

* * * * *